(12) United States Patent
Shuto

(10) Patent No.: US 10,946,714 B2
(45) Date of Patent: Mar. 16, 2021

(54) ELECTRICALLY DRIVEN VEHICLE

(71) Applicant: HONDA MOTOR CO., LTD., Tokyo (JP)

(72) Inventor: Hironori Shuto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 16/166,253

(22) Filed: Oct. 22, 2018

(65) Prior Publication Data

US 2019/0126717 A1  May 2, 2019

(30) Foreign Application Priority Data

Nov. 2, 2017 (JP) .............................. JP2017-212716

(51) Int. Cl.
*B60H 1/00* (2006.01)
*B60W 10/30* (2006.01)
(Continued)

(52) U.S. Cl.
CPC ..... *B60H 1/00385* (2013.01); *B60H 1/00392* (2013.01); *B60H 1/00849* (2013.01); *B60W 10/08* (2013.01); *B60W 10/26* (2013.01); *B60W 10/30* (2013.01); *B60H 2001/2237* (2013.01); *B60K 6/22* (2013.01); *B60L 58/10* (2019.02); *B60W 20/00* (2013.01); *B60W 2510/244* (2013.01); *B60W 2710/08* (2013.01);
(Continued)

(58) Field of Classification Search
CPC ............ B60H 1/00385; B60H 1/00392; B60H 1/00849; B60H 1/00428; B60H 1/247; B60W 10/08; B60W 10/26; B60W 10/30; B60L 1/04
See application file for complete search history.

(56) References Cited

U.S. PATENT DOCUMENTS

| 2005/0092479 | A1* | 5/2005 | Umeo | B60H 1/247 165/202 |
| 2012/0022744 | A1* | 1/2012 | Endo | B60L 58/15 701/36 |

FOREIGN PATENT DOCUMENTS

| JP | 2011-218975 | 11/2011 |
| JP | 2015-074346 | 4/2015 |

(Continued)

OTHER PUBLICATIONS

Japanese Notice of Allowance for Japanese Patent Application No. 2017-212716 dated Oct. 8, 2019.
(Continued)

*Primary Examiner* — Anne Marie Antonucci
*Assistant Examiner* — Andrew J Cromer
(74) *Attorney, Agent, or Firm* — Amin, Turocy & Watson, LLP

(57) ABSTRACT

An electrically driven vehicle includes an electric motor, a power storage device, an air conditioner, a heat exchanger of a refrigerating cycle, a heater and a controller, the air conditioner includes an internal air suction port and the foot blowout port installed at a position close to the internal air suction port, and, when a remaining capacity of the power storage device exceeds a predetermined value, the controller operates the refrigerating cycle and the heater, and further, is switched to an internal air circulation in which conditioning air blown out of the foot blowout port is suctioned from the internal air suction port.

4 Claims, 10 Drawing Sheets

(51) Int. Cl.
  *B60W 10/08* (2006.01)
  *B60W 10/26* (2006.01)
  *B60W 20/00* (2016.01)
  *B60K 6/22* (2007.10)
  *B60L 58/10* (2019.01)
  *B60H 1/22* (2006.01)

(52) U.S. Cl.
  CPC ... *B60W 2710/244* (2013.01); *B60W 2710/30* (2013.01); *B60Y 2200/91* (2013.01); *B60Y 2200/92* (2013.01)

(56) References Cited

FOREIGN PATENT DOCUMENTS

| | | |
|---|---|---|
| JP | 2015-162947 | 9/2015 |
| JP | 2015-162993 | 9/2015 |
| JP | 2018-052165 | 4/2018 |

OTHER PUBLICATIONS

Japanese Office Action for Japanese Patent Application No. 2017-212716 dated May 14, 2019.

\* cited by examiner

ELECTRICALLY DRIVEN VEHICLE

CROSS-REFERENCE TO RELATED APPLICATION

Priority is claimed on Japanese Patent Application No. 2017-212716, filed Nov. 2, 2017, the content of which is incorporated herein by reference.

BACKGROUND OF THE INVENTION

Field of the Invention

The present invention relates to an electrically driven vehicle.

Description of Related Art

In an electrically driven vehicle, an electric motor functions as a generator upon braking. That is, rotation of driving wheels is transmitted to an output shaft of the electric motor, and electric power is regenerated at the electric motor due to rotation of the output shaft. The regenerated alternating current is converted into direct current by an inverter, and the converted direct current is supplied to a power storage device from the inverter to be charged into the power storage device.

In an electrically driven vehicle, in order to protect the power storage device from overcharging, when a remaining capacity of the power storage device exceeds a predetermined value, a configuration of restricting a regeneration amount in the electric motor is provided. However, when a regeneration amount due to the electric motor is restricted, a regeneration braking force is weaken than usual, and this gives an occupant an uncomfortable feeling due to the variation in brake feeling. On the other hand, if reducing the variation in brake feeling is given priority, and the restriction of the regeneration amount during braking is eliminated, a deterioration of a battery due to overcharge occurs.

As a countermeasure for this, a means configured to increase the power consumption of an electrical load (hereinafter, referred to as an air conditioner for a vehicle) mounted on an electrically driven vehicle when a remaining capacity of a power storage device exceeds a predetermined value upon generation of a regeneration braking force has been disclosed.

In addition, a method of operating both of a cooling apparatus for cooling an inside of a passenger compartment and a heating apparatus for heating the inside of a passenger compartment when the electric power regenerated by an electric motor exceeds a predetermined value of a remaining capacity of a power storage device has been disclosed (for example, see Japanese Unexamined Patent Application, First Publication No. 2015-162947).

SUMMARY OF THE INVENTION

However, in the electrically driven vehicle of Japanese Unexamined Patent Application, First Publication No. 2015-162947, it is conceivable that conditioning air blown out of an air conditioner for a vehicle may hit an occupant and impair comfort. Specifically, it is conceivable that cold air conditioning air may be blown out even if the passenger does not require cooling air conditioning, or warm air conditioned air may be blown out even if heating is not required. Further, it is conceivable that air conditioning air may be blown out to the occupant even though air blowing is not required.

The present invention is directed to providing an electrically driven vehicle capable of consuming surplus electric power while minimizing an influence on an occupant to a low level when a remaining capacity of a power storage device exceeds a predetermined value during regeneration by an electric motor.

(1) An electrically driven vehicle according to an aspect of the present invention includes an electric motor; a power storage device electrically connected to the electric motor; an air conditioner; a heat exchanger of a refrigerating cycle installed in a path of the air conditioner; a heater; and a controller that controls at least the electric motor, the power storage device, the air conditioner, the heat exchanger and the heater, wherein the air conditioner includes an internal air suction port that opens in a passenger compartment, and a foot blowout port installed at a position close to the internal air suction port and from which conditioning air is blown out toward a feet of an occupant, and in a case a remaining capacity of the power storage device exceeds a predetermined value, the controller operates the refrigerating cycle and the heater, and further, switches to an internal air circulation in which the conditioning air blown out of the foot blowout port is suctioned from the internal air suction port.

In this way, since the heat exchanger of the refrigerating cycle and the heater are provided in the path of the air conditioner, the conditioning air can be cooled to a low temperature by the heat exchanger, and the conditioning air having the low temperature can be heated by the heater. Further, the internal air suction port and the foot blowout port are installed at positions close to each other. Accordingly, it is possible to switch to internal air circulation in which the conditioning air reheated by the heater is suctioned into the internal air suction port via the foot blowout port and the passenger compartment.

That is, the conditioning air reheated by the heater can be reintroduced into the heat exchanger to be cooled or heated by the heat exchanger or the heater again. In this way, forced electric power consumption can be facilitated by sequentially repeating the internal air circulation of the conditioning air. Accordingly, when the remaining capacity of the power storage device exceeds a predetermined value during regeneration by the electric motor, surplus electric power can be consumed. Accordingly, overcharging of the power storage device can be prevented by lowering a rate of increase in the remaining capacity of the power storage device (so called, active electric power consuming control).

Further, the foot blowout port is installed at a position close to the internal air suction port. Accordingly, the conditioning air blown out of the foot blowout port into the passenger compartment is mixed with air around the feet of an occupant and flows into the internal air suction port.

Accordingly, an influence on the inside of the passenger compartment or to the occupant (for example, a temperature change in the passenger compartment) can be minimized to a low level by the conditioning air blown out of the foot blowout port into the passenger compartment.

(2) In the aspect of above mentioned (1), the refrigerating cycle may be a cooling-dedicated circuit.

In this way, since the refrigerating cycle is a cooling-dedicated circuit, a configuration of the refrigerating cycle can be simplified, and costs can be minimized.

(3) In the aspect of above mentioned (1), the refrigerating cycle may be a circuit that is able to select cooling or heating of the conditioning air using the heat exchanger by switching a switching valve.

In this way, since cooling or heating of the conditioning air by the heat exchanger of the refrigerating cycle can be selected, convenience of the air conditioner for a vehicle can be improved.

(4) An electrically driven vehicle according to another aspect of the present invention includes an electric motor; a power storage device electrically connected to the electric motor; an air conditioner; a heat exchanger of a refrigerating cycle installed in a path of the air conditioner; a heater; and a controller that controls at least the electric motor, the power storage device, the air conditioner, the heat exchanger and the heater, wherein the air conditioner includes an internal air suction port that opens in a passenger compartment, the foot blowout port installed at a position close to the internal air suction port and from which conditioning air is blown out toward a feet of an occupant, and a communication section that allows the foot blowout port and the internal air suction port to communicate with each other, and in a case a remaining capacity of the power storage device exceeds a predetermined value, the controller operates the refrigerating cycle and the heater, and further, switches to a circulation in which the conditioning air blown out of the foot blowout port is suctioned from the internal air suction port via the communication section.

In this way, since the heat exchanger of the refrigerating cycle and the heater are provided in the path of the air conditioner, the conditioning air can be cooled to a low temperature by the heat exchanger, and the conditioning air having a low temperature can be heated by the heater. Further, the internal air suction port and the foot blowout port are installed at positions close to each other. Accordingly, it is possible to switch to a circulation in which the conditioning air reheated by the heater is suctioned into the internal air suction port via the foot blowout port and the communication section.

That is, the conditioning air reheated by the heater can be reintroduced into the heat exchanger to be cooled or heated by the heat exchanger or the heater again. In this way, forced electric power consumption can be facilitated by sequentially repeating the circulation of the conditioning air. Accordingly, when the remaining capacity of the power storage device exceeds the predetermined value during regeneration by the electric motor, surplus electric power can be consumed. Accordingly, overcharging of the power storage device can be prevented by lowering a rate of increase in the remaining capacity of the power storage device (so called, active electric power consuming control).

Further, the foot blowout port communicates with the internal air suction port via the communication section. Accordingly, the conditioning air blown out of the foot blowout port flows into the internal air suction port again via the communication section, the conditioning air heated by the air conditioner for a vehicle can be reintroduced into the internal air suction port without blowing-out into the passenger compartment. Accordingly, an influence on the inside of the passenger compartment or to the occupant by the heated conditioning air (for example, a temperature change in the passenger compartment) can be minimized to a low level.

According to the present invention, when the remaining capacity of the power storage device exceeds the predetermined value during regeneration by the electric motor, since cooling and heating by the heat exchanger and the heater are sequentially repeated by circulation of the conditioning air, surplus electric power can be consumed while minimizing an influence on an occupant to a low level.

DETAILED DESCRIPTION OF THE INVENTION

Embodiments of the present invention will be described with reference to the accompanying drawings.

While a battery electric vehicle (BEV) is exemplified as an electrically driven vehicle in a first embodiment, a second embodiment and a fourth embodiment, there is no limitation thereto. For example, the electrically driven vehicle may be another vehicle such as a hybrid vehicle (HV), a fuel cell vehicle (FCV), or the like.

In addition, in a third embodiment, for example, a hybrid vehicle is exemplified as an electrically driven vehicle.

First Embodiment

Figure 1:
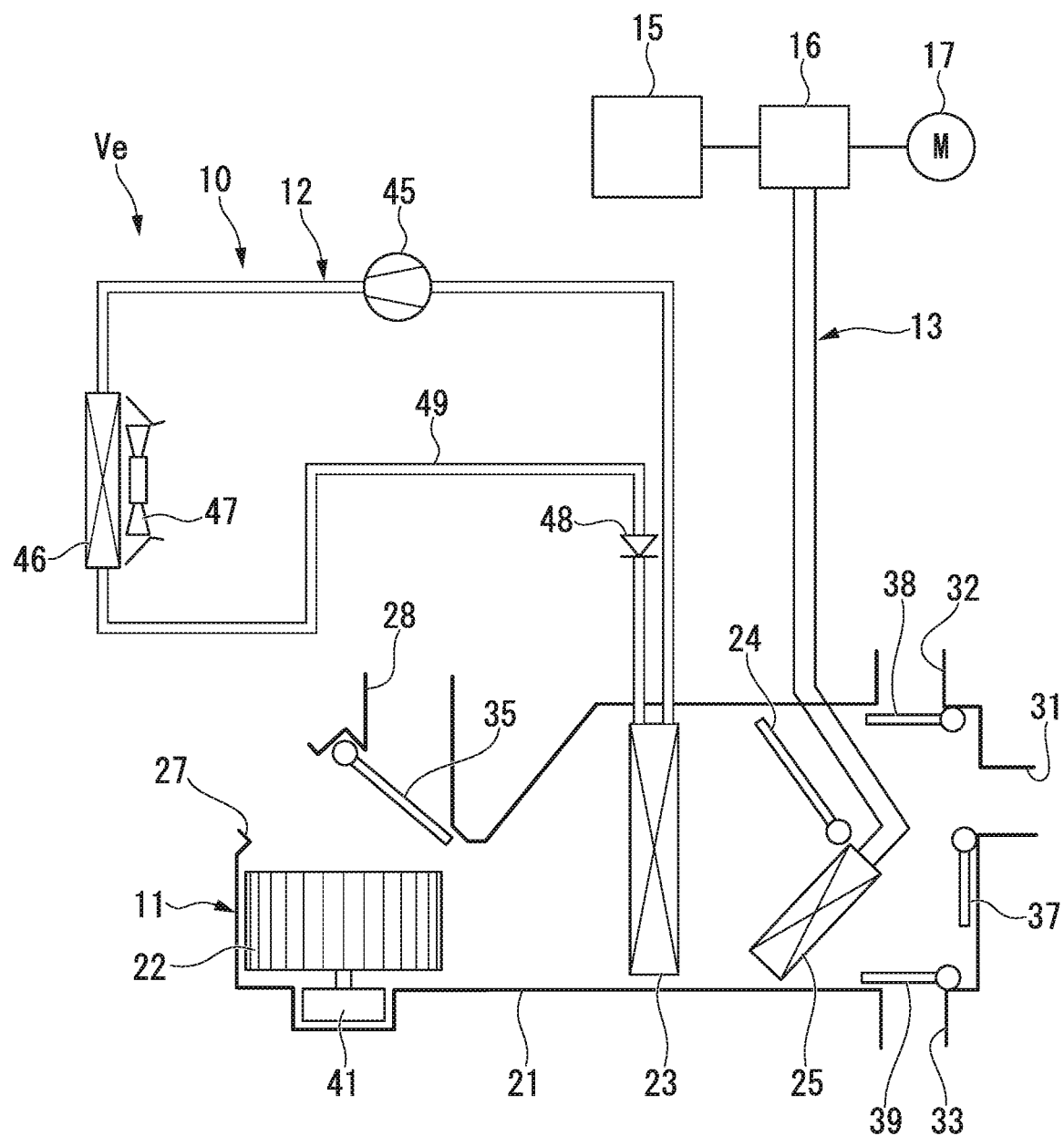
FIG. 1 is a configuration view showing an electrically driven vehicle including an air conditioner for a vehicle according to a first embodiment of the present invention.

FIG. 1 is a configuration view of an electrically driven vehicle Ve including an air conditioner 10 for a vehicle according to a first embodiment. As shown in FIG. 1, the air conditioner 10 for a vehicle is mounted on the electrically driven vehicle Ve such as a battery electric vehicle or the like in which an engine (an internal combustion engine) serving as a vehicle driving source is not provided. The electrically driven vehicle Ve is a battery electric vehicle including the air conditioner for a vehicle (the air conditioner) 10, a controller (an electronic control unit (ECU)) 15, a power storage device (a battery) 16 and an electric motor (a traveling motor) 17.

The electric motor 17 is electrically connected to the power storage device 16 via an inverter (not shown). Upon driving of the electric motor 17, direct current output from the power storage device 16 is converted into alternating current by the inverter and supplied to the electric motor 17. Since alternating current is supplied to the electric motor 17, the electric motor 17 generates a driving force. Since the electric motor 17 generates a driving force, driving wheels are rotated and driven in a forward direction or a backward direction.

Meanwhile, upon braking of the electrically driven vehicle Ve, the electric motor 17 functions as a generator. That is, rotation of the driving wheel is transmitted to an output shaft of the electric motor 17, and electric power is regenerated by the electric motor 17 due to rotation of the output shaft. Here, the electric motor 17 becomes a resistance, and the resistance applies as a regeneration braking force to the electrically driven vehicle Ve. Alternating current regenerated by the electric motor 17 is converted into direct current by the inverter. The converted direct current is supplied to the power storage device 16 from the inverter and stored in the power storage device 16.

In addition, the air conditioner 10 for a vehicle is mounted on the electrically driven vehicle Ve. The air conditioner 10 for a vehicle mainly includes an air-conditioning unit 11, a refrigerating cycle 12 through which coolant can circulate, and a heating system 13.

The air-conditioning unit 11 includes a duct (a path) 21 through which conditioning air circulates, a blower 22 accommodated in the duct 21, an evaporator (a heat exchanger) 23, an air mix damper 24 and an indoor condenser (a heater) 25.

The duct 21 has air suction ports 27 and 28 and air blowout ports 31, 32 and 33. The blower 22, the evaporator 23, the air mix damper 24 and the indoor condenser 25 are installed in the duct 21. The blower 22, the evaporator 23, the air mix damper 24 and the indoor condenser 25 are sequentially disposed from an upstream side (on a side of the air suction ports 27 and 28) toward a downstream side (on a side of the air blowout ports 31 to 33) of the duct 21 in a flow direction of the conditioning air.

The air suction ports 27 and 28 constitute an internal air suction port and an external air suction port, respectively. Hereinafter, the air suction port 27 is referred to as "the internal air suction port 27" and the air suction port 28 is referred to as "the external air suction port 28." The internal air suction port 27 is a suction port that opens in a passenger compartment 58 (see FIG. 3) and configured to introduce internal air. The external air suction port 28 is a suction port that opens outside of the passenger compartment 58 and configured to introduce external air.

Since the internal air suction port 27 and the external air suction port 28 are opened and closed by a switching damper 35, and for example, an opening angle of the switching damper 35 is adjusted according to control by the controller 15, flow rate proportions of internal air and external air that flow into the duct 21 are adjusted.

The air blowout ports 31, 32 and 33 constitute a VENT blowout port, a DEF blowout port and a foot blowout port, respectively. Hereinafter, the air blowout port 31 is referred to as "the VENT blowout port 31," the air blowout port 32 is referred to as "the DEF blowout port 32" and the air blowout port 33 is referred to as "the foot blowout port 33." The VENT blowout port 31 can be opened and closed by a VENT damper 37, and the DEF blowout port 32 can be opened and closed by a DEF damper 38. In addition, the foot blowout port 33 can be opened and closed by a foot damper 39.

For example, opening and closing of the VENT damper 37, the DEF damper 38 and the foot damper 39 are switched between according to control by the controller 15. Since opening and closing of the dampers 37, 38 and 39 are switched, a ratio of air that is blown out of the blowout ports 31, 32 and 33 is adjusted.

The foot blowout port 33 is a blowout port configured to blow out the conditioning air toward the feet 56b (see FIG. 4) of an occupant 56. The foot blowout port 33 is installed at a position close to the internal air suction port 27.

The reason for installing the foot blowout port 33 at the position close to the internal air suction port 27 will be described below in detail.

For example, the blower 22 is driven by a motor 41 according to a driving voltage applied to the motor under control by the controller 15. The blower 22 sends out the conditioning air (at least one of the internal air and the external air) introduced into the duct 21 from the internal air suction port 27 or the external air suction port 28 toward a downstream side, i.e., toward the evaporator 23 and the indoor condenser 25.

The evaporator 23 allows heat exchange between a low pressure coolant introduced thereinto and an atmosphere in the passenger compartment (in the duct 21), and for example, the conditioning air passing through the evaporator 23 is cooled by absorption of heat when the coolant is evaporated.

The indoor condenser 25 uses an electric heater as an example. For example, a positive temperature coefficient (PTC) heater may be exemplified as the electric heater. The indoor condenser 25 is electrically connected to, for example, the power storage device (a battery) 16.

Since the indoor condenser 25 is operated by electric power supplied from the power storage device 16, the indoor condenser 25 performs heat exchange with the atmosphere in the passenger compartment (in the duct 21) while being heated. That is, the conditioning air passing through the indoor condenser 25 is heated through heat radiation of the indoor condenser 25.

For example, the air mix damper 24 is pivoted according to control by the controller 15. The air mix damper 24 is pivoted between a heating position at which a ventilation route, which extends toward the indoor condenser 25 from a downstream side of the evaporator 23 in the duct 21, is opened and a cooling position at which the ventilation route, which bypasses the indoor condenser 25, is opened. Accordingly, among the conditioning air passing through the evaporator 23, an air volume ratio between an air volume introduced into the indoor condenser 25 and an air volume bypassing the indoor condenser 25 and discharged into the passenger compartment, is adjusted.

The refrigerating cycle 12 is a cooling-dedicated circuit. The refrigerating cycle 12 includes, for example, the evaporator 23 of the air-conditioning unit 11, a compressor 45 configured to compress coolant, an outdoor condenser (an outdoor heat exchanger) 46, a first air guiding means 47 and a cooling expansion valve 48. Components of the refrigerating cycle 12 are connected to each other via a coolant flow path 49. The coolant flow path 49 is a flow path through which the coolant can circulate.

That is, the refrigerating cycle 12 constitutes a coolant circuit included in the electrically driven vehicle Ve. The refrigerating cycle 12 is a cooling-dedicated circuit. Since the refrigerating cycle 12 is the cooling-dedicated circuit, a configuration of the refrigerating cycle 12 can be simplified, and costs of the air conditioner 10 for a vehicle can be minimized.

The compressor 45 suctions the coolant on a side of a gas-liquid separator (not shown) and ejects the coolant toward the outdoor condenser 46. For example, the compressor 45 is driven by the motor according to the driving voltage applied to the motor under control by the controller 15. The compressor 45 suctions a gas phase coolant (a coolant gas) from the gas-liquid separator and ejects the coolant to the outdoor condenser 46 as a high temperature and high pressure coolant after compressing the coolant.

The outdoor condenser 46 is disposed outside the passenger compartment and performs heat exchange between the coolant introduced thereinto and the atmosphere outside the passenger compartment. The outdoor condenser 46 can radiate heat to the atmosphere outside the passenger compartment using the high temperature coolant flowing thereinto and cools the coolant through heat radiation to the atmosphere outside the passenger compartment and blowing of the first air guiding means 47 when the refrigerating cycle 12 is operated.

For example, while a condenser fan configured to control the volume of the air passing through the outdoor condenser 46 is exemplified as the first air guiding means 47, as another example, for example, a grille shutter or the like may be used. When the first air guiding means 47 is the condenser fan, for example, the condenser fan is driven according to a driving voltage applied to the motor of the condenser fan under control by the controller 15.

The cooling expansion valve 48 is disposed downstream from the outdoor condenser 46. The cooling expansion valve 48 is, for example, a throttle valve that can adjust a bore diameter of an opening section. The cooling expansion valve 48 decompresses and expands the coolant passing through the indoor condenser 25, and then, ejects the coolant in a spray form in the two phases of a gas and a liquid (liquid phase rich) at a low temperature and a low pressure to the indoor condenser 25.

For example, the cooling expansion valve 48 decompresses and expands the coolant discharged from the outdoor condenser 46 according to a valve opening angle controlled by the controller 15, and then, ejects the coolant in a spray form in the two phases of a gas and a liquid (gas phase rich) at a low temperature and a low pressure to the evaporator 23.

The controller 15 performs air-conditioning control using the coolant in the air-conditioning unit 11 and the refrigerating cycle 12. The controller 15 controls the air conditioner 10 for a vehicle on the basis of a command signal input by an operator via a switch or the like (not shown) disposed in the passenger compartment. In addition, the controller 15 can control the electric motor 17 and the power storage device 16, and further, can control switching of an operation mode or the like of the air conditioner 10 for a vehicle.

Information of a state of charge (SOC) that is a charge level of the power storage device 16 or chargeable electric power calculated on the basis of the SOC is input into the controller 15. The chargeable electric power is the electric power with which the power storage device 16 is able to be charged. For example, the chargeable electric power can be obtained from a table in which the chargeable electric power decreases as the SOC increases and becomes 0 at an upper limit value in order to prevent overcharging of the power storage device 16.

In addition, the controller 15 determines whether a remaining capacity of the power storage device 16 exceeds a predetermined value on the basis of the chargeable electric power. Further, information of the regenerated electric power input to the power storage device 16 is input to the controller 15.

In addition, the controller 15 has a function of being able to control the electric motor 17, the air conditioner 10 for a vehicle, the compressor 45, the first air guiding means (the fan) 47, and so on. Further, the controller 15 can select and control the switching damper 35, the air mix damper 24, the VENT damper 37, the DEF damper 38 and the foot damper 39 while operating the compressor 45 when the remaining capacity of the power storage device 16 exceeds the predetermined value upon regeneration control.

Next, operations of a heating operation mode and a cooling operation mode of the air conditioner 10 for a vehicle will be described. First, the heating operation mode of the air conditioner 10 for a vehicle will be described.

Heating Operation Mode

When a heating operation is performed in the air conditioner 10 for a vehicle, the air mix damper 24 is disposed at a heating position at which a ventilation route opens toward the indoor condenser 25. In the air-conditioning unit 11, for example, the internal air suction port 27 is in an open state and the external air suction port 28 is in a closed state. In addition, in the air-conditioning unit 11, for example, the VENT blowout port 31 is in an open state, and the DEF blowout port 32 and the foot blowout port 33 are in a closed state. Opening and closing of each of the suction ports 27 and 28 or each of the blowout ports 31 to 33 are arbitrarily changed according to an operation of a driver.

In this state, a high temperature and high pressure coolant is ejected from the compressor 45 of the refrigerating cycle 12, and the ejected coolant flows into the outdoor condenser 46. Heat exchange is performed between the high temperature and high pressure coolant flowing into the outdoor condenser 46 and the atmosphere outside the passenger compartment. That is, the heat of the coolant is radiated to the atmosphere outside the passenger compartment, and further, the coolant flowing into the outdoor condenser 46 is cooled by blowing of the first air guiding means 47.

The cooled coolant flows into the cooling expansion valve 48. The flowing coolant is expanded by the cooling expansion valve 48 to form a liquid phase-rich spray form, and then, the conditioning air in the duct 21 of the air-conditioning unit 11 is cooled by heat absorption in the evaporator 23.

The coolant of the gas phase rich passed through the evaporator 23 flows into the gas-liquid separator, is separated into a gas and a liquid in the gas-liquid separator, and then, the coolant of the gas phase is suctioned to the compressor 45.

In addition, since the electric power is supplied from the power storage device 16 to the indoor condenser 25, the indoor condenser 25 is heated. Since heat is radiated from the heated indoor condenser 25, the conditioning air passing through the indoor condenser 25 is heated.

Therefore, according to the air conditioner 10 for a vehicle, for example, the conditioning air is introduced into the duct 21 from the internal air suction port 27 by driving of the blower 22. The introduced conditioning air is sent to the evaporator 23. Since the conditioning air passes through the evaporator 23, the conditioning air is cooled through heat exchange with the evaporator 23. Since the cooled conditioning air passes through the indoor condenser 25, the conditioning air is heated through heat exchange with the indoor condenser 25. For example, the heat-exchanged conditioning air may be supplied from the VENT blowout port 31 to heat the passenger compartment.

Next, the cooling operation mode of the air conditioner 10 for a vehicle will be described.

Cooling Operation Mode

When a cooling operation is performed by the air conditioner 10 for a vehicle, the air mix damper 24 is disposed at a cooling position such that the conditioning air passed through the evaporator 23 bypasses the indoor condenser 25. In the air-conditioning unit 11, for example, the internal air suction port 27 is in an open state, and the external air suction port 28 is in a closed state. In addition, in the air-conditioning unit 11, for example, the VENT blowout port 31 is in an open state, and the DEF blowout port 32 and the foot blowout port 33 are in a closed state. Opening and closing of each of the suction ports 27 and 28 or each of the blowout ports 31 to 33 are arbitrarily changed by an operation of a driver.

In this state, a high temperature and high pressure coolant is ejected from the compressor 45 of the refrigerating cycle 12, and the ejected coolant is guided to the outdoor condenser 46. Heat exchange is performed between the high temperature and high pressure coolant flowing into the outdoor condenser 46 and the atmosphere outside the passenger compartment. That is, heat of the coolant is radiated to the atmosphere outside the passenger compartment, and further, the coolant is cooled by blowing of the first air guiding means 47.

The cooled coolant flows into the cooling expansion valve 48. The flowed coolant is expanded by the cooling expansion valve 48 to form a liquid phase-rich spray form, and then, the conditioning air in the duct 21 of the air-conditioning unit 11 is cooled through heat absorption in the evaporator 23. The cooled conditioning air is supplied from the VENT blowout port 31 to cool the passenger compartment after bypassing the indoor condenser 25.

Then, an example in which active electric power consuming control is performed by the air conditioner 10 for a vehicle such that the remaining capacity of the power storage device 16 does not exceed the predetermined value when the regenerated electric power is accumulated in the power storage device 16 of the air conditioner 10 for a vehicle will be described on the basis of FIG. 2 to FIG. 4.

Figure 2:
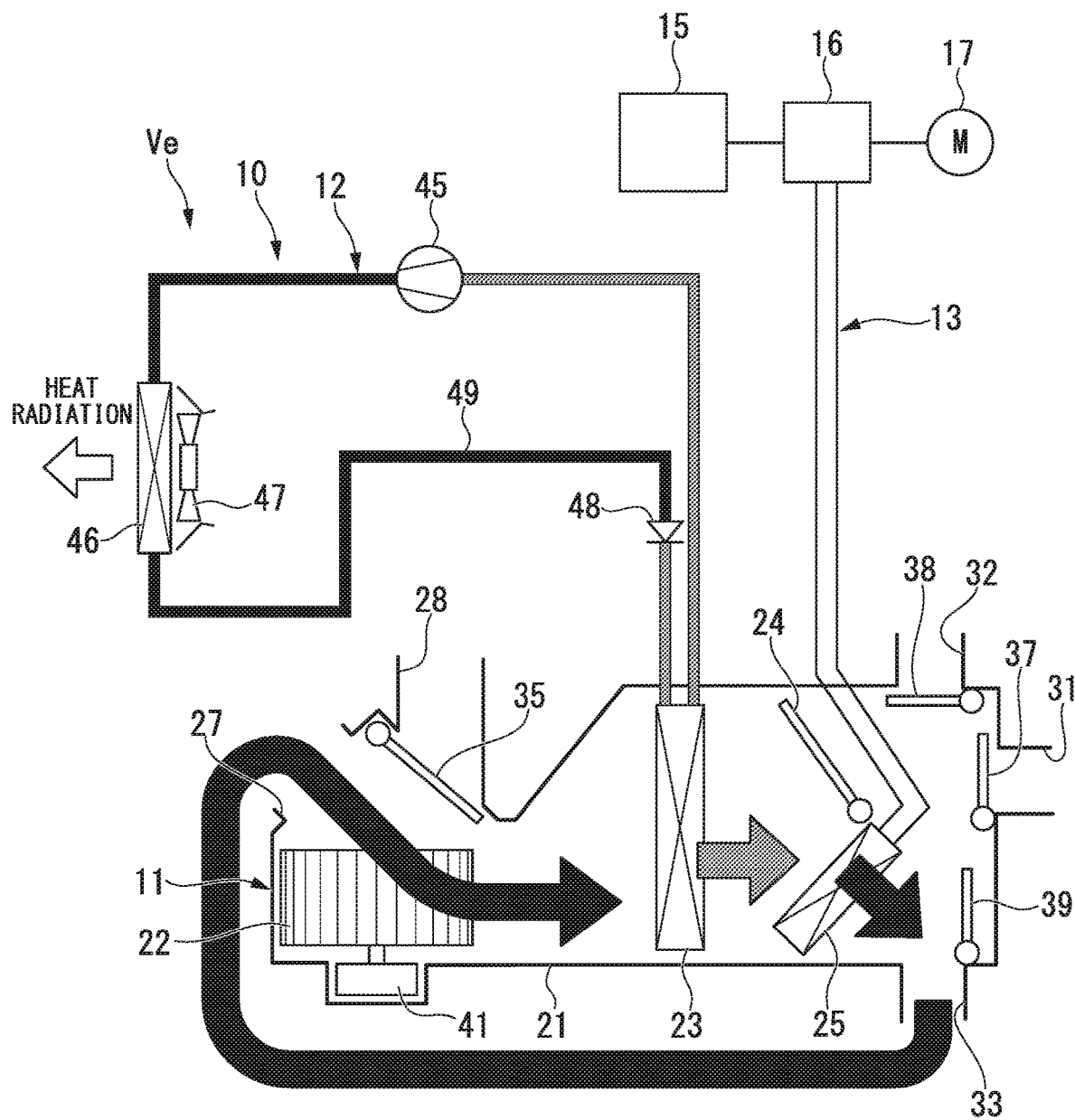
FIG. 2 is a configuration view for explaining an example in which active electric power consuming control is performed by the air conditioner for a vehicle according to the first embodiment of the present invention.

As shown in FIG. 2, the controller 15 disposes the air mix damper 24 at a heating position at which a ventilation route opens toward the indoor condenser 25 when the remaining capacity of the power storage device 16 exceeds the predetermined value. In addition, the internal air suction port 27 is in an open state, and the external air suction port 28 is in a closed state. Further, the foot blowout port 33 is in an open state, and the VENT blowout port 31 and the DEF blowout port 32 are in a closed state.

Accordingly, the air conditioner 10 for a vehicle is changed to internal air circulation of suctioning the conditioning air blown out of the foot blowout port 33 from the internal air suction port 27.

In this state, the high temperature and high pressure coolant is ejected from the compressor 45 of the refrigerating cycle 12 and flows into the outdoor condenser 46. Heat of the high temperature and high pressure coolant is exchanged with the atmosphere outside the passenger compartment, and heat of the coolant is radiated to the atmosphere outside the passenger compartment. Further, the coolant is cooled by blowing of the first air guiding means 47.

The cooled coolant is expanded by the cooling expansion valve 48 to form a liquid phase-rich spray form, and the conditioning air in the duct 21 is cooled through heat absorption in the evaporator 23. The conditioning air cooled by the evaporator 23 passes through the indoor condenser 25.

The indoor condenser 25 is heated by supplying the electric power from the power storage device 16. Accordingly, since heat is radiated from the heated indoor condenser 25, the conditioning air passing through the indoor condenser 25 is heated. Accordingly, the electric power can be consumed by the air conditioner 10 for a vehicle. The heated conditioning air is blown out of the foot blowout port 33 into the passenger compartment.

Figure 3:
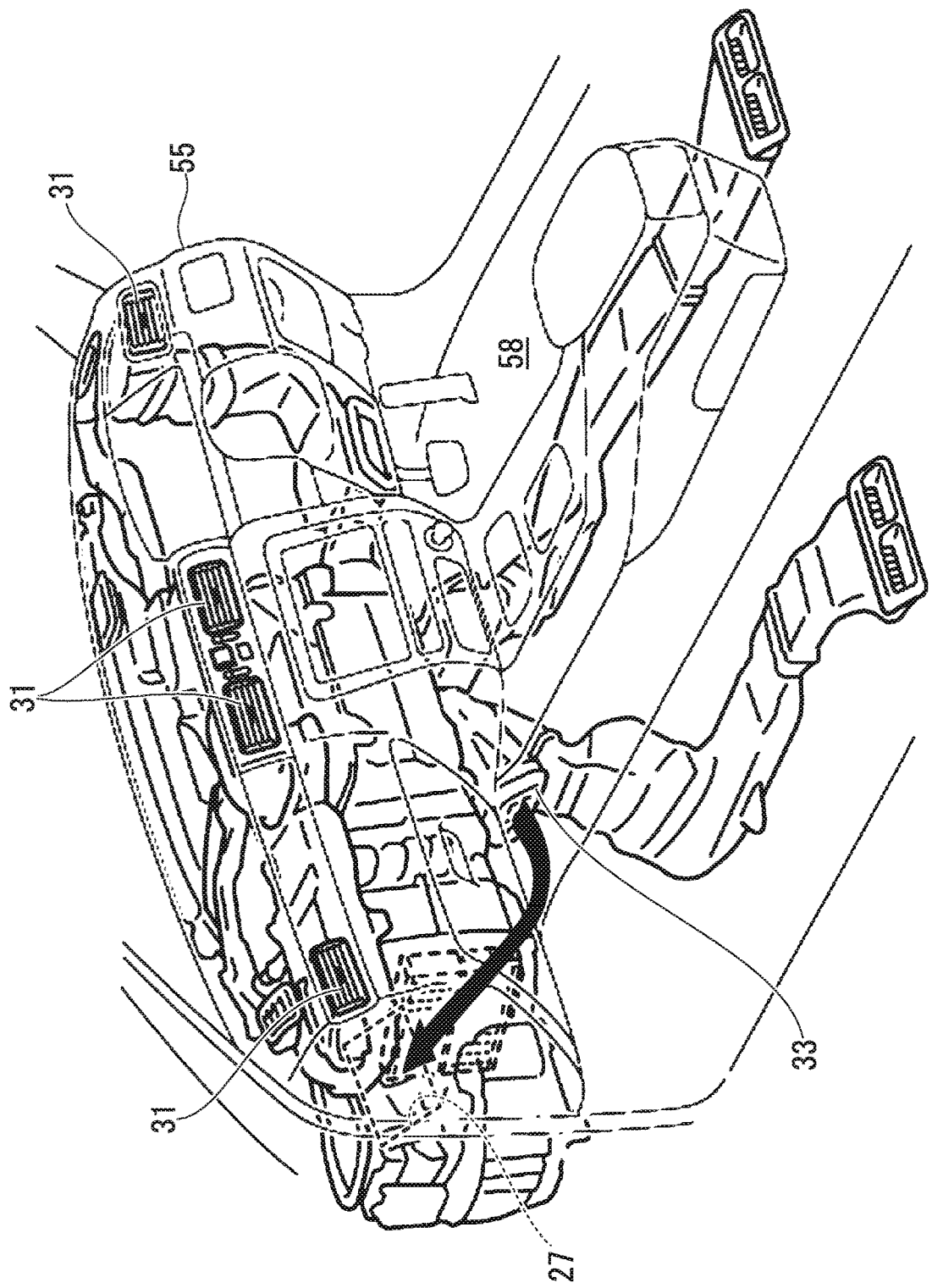
FIG. 3 is a perspective view for explaining an example in which internal air circulation is performed by the air conditioner for a vehicle according to the first embodiment of the present invention.
Figure 4:
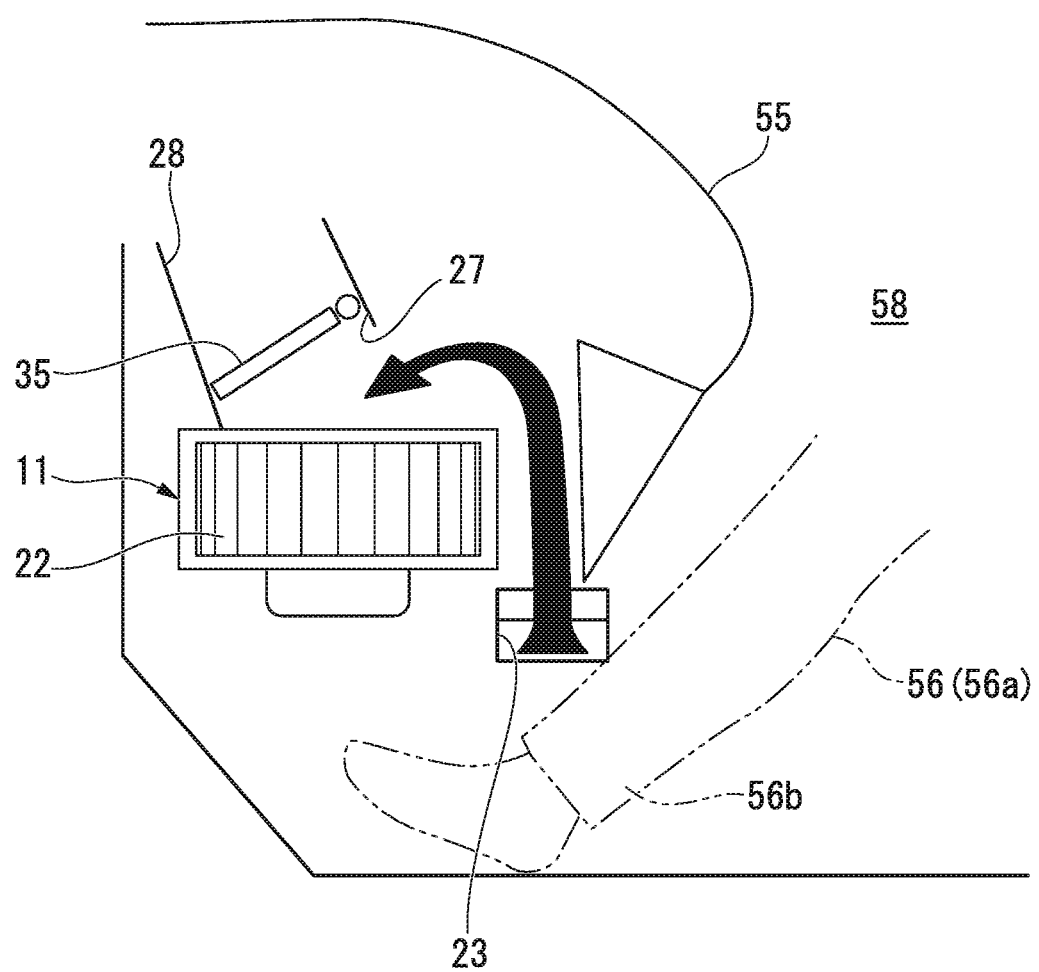
FIG. 4 is a cross-sectional view for explaining an example in which internal air circulation is performed by the air conditioner for a vehicle according to the first embodiment of the present invention.

As shown in FIG. 3 and FIG. 4, for example, the foot blowout port 33 is installed below a center of an installment panel 55 in the vehicle width direction and on the installment panel 55 on a front side of the vehicle body. The foot blowout port 33 opens toward an outer side in the vehicle width direction in the passenger compartment 58.

In addition, for example, the internal air suction port 27 is installed on a left upper side of the installment panel 55 in the vehicle width direction and on the installment panel 55 on a front side of the vehicle body. In other words, the internal air suction port 27 is installed on a left side of the foot blowout port 33 in the vehicle width direction and above the foot blowout port 33, and opens toward a rear side of the vehicle body in the passenger compartment 58 in an inclined shape.

The foot blowout port 33 opens toward the internal air suction port 27, and communicates with the internal air suction port 27 via the passenger compartment 58. Accordingly, the conditioning air blown out of the foot blowout port 33 into the passenger compartment 58 moves toward the internal air suction port 27. Here, the internal air suction port 27 opens in an inclined shape toward a rear side of the vehicle body so as to easily accept the conditioning air blown out of the foot blowout port 33. Further, the foot blowout port 33 is disposed at a position close to the internal air suction port 27 in the vehicle width direction. Accordingly, the conditioning air blown out of the foot blowout port 33 can be mixed with the air in the passenger compartment 58 to efficiently flow into the internal air suction port 27.

In addition, the foot blowout port 33 and the internal air suction port 27 are installed at a position away from a leg section 56a of the occupant 56 on a front side of the vehicle body and a position away from above the foot 56b of the leg section 56a. Accordingly, the conditioning air blown out of the foot blowout port 33 flows through a place away from the leg section 56a or the foot 56b of the occupant 56 and is mixed with air around the feet of the occupant 56 and flows into the internal air suction port 27. Accordingly, an influence on the inside of the passenger compartment 58 or to the occupant 56 (for example, a temperature change in the passenger compartment) can be minimized to a low level by the conditioning air blown out of the foot blowout port 33 into the passenger compartment 58.

In this way, the conditioning air blown out of the foot blowout port 33 into the passenger compartment 58 is mixed with the air around the feet of the occupant 56 and flows into the internal air suction port 27 again. That is, the conditioning air cooled or heated in the duct 21 (see FIG. 2) is introduced into the duct 21 again. Further, the reintroduced conditioning air is cooled or heated again by the evaporator 23 or the indoor condenser 25 in the duct 21, and thus, internal air circulation of the conditioning air can be secured.

Since the internal air circulation is sequentially repeated, forced electric power consumption can be facilitated by the air conditioner 10 for a vehicle. Accordingly, overcharging of the power storage device 16 can be prevented by lowering a rate of increase in the remaining capacity of the power storage device 16 (so called, active electric power consuming control).

Next, a second embodiment to a fourth embodiment of the air conditioner 10 for a vehicle described in the first embodiment will be described on the basis of FIG. 5 to FIG. 11. Further, in the second embodiment to the fourth embodiment, the same members as or similar members to the air conditioner 10 for a vehicle of the first embodiment are designated by the same reference numerals and detailed description thereof will be omitted.

Second Embodiment

Figure 5:
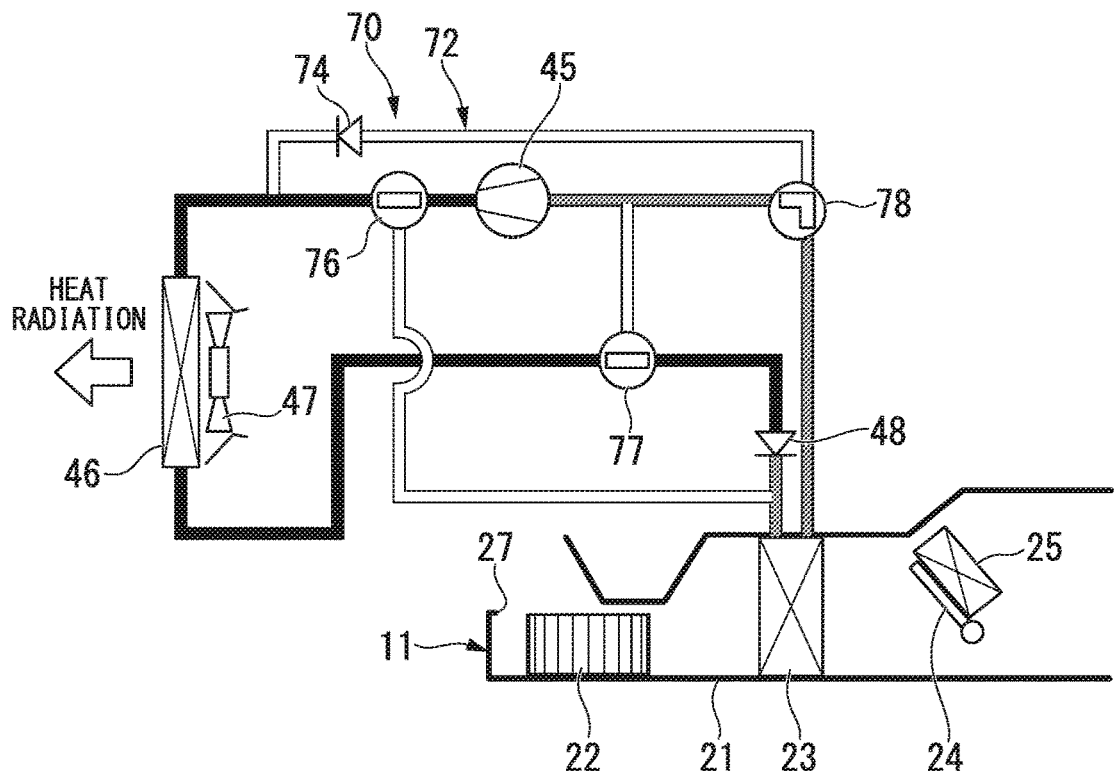
FIG. 5 is a configuration view showing an air conditioner for a vehicle according to a second embodiment of the present invention.

First, an air conditioner for a vehicle (an air conditioner) 70 of the second embodiment will be described on the basis of FIG. 5 to FIG. 7. As shown in FIG. 5, the air conditioner 70 for a vehicle is obtained by replacing the refrigerating cycle 12 of the first embodiment with a refrigerating cycle 72, and the other configurations are similar to those of the air conditioner 10 for a vehicle of the first embodiment.

The refrigerating cycle 72 includes, in addition to the refrigerating cycle 12 of the first embodiment, a heating expansion valve 74, a first switching valve 76, a second switching valve 77 and a third switching valve 78.

The heating expansion valve 74 is installed between the third switching valve 78 and the outdoor condenser 46.

The heating expansion valve 74 is, for example, a throttle valve that can adjust a diameter of an opening section. The heating expansion valve 74 decompresses and expands the coolant passed through the indoor condenser 25, and then, ejects the coolant in a spray form in the two phases of a gas and a liquid (liquid phase rich) at a low temperature and a low pressure to the evaporator 23.

According to the refrigerating cycle 72, since the first switching valve (a switching valve) 76, the second switching valve (a switching valve) 77 and the third switching valve (a switching valve) 78 are appropriately switched, cooling or heating of the conditioning air by the indoor condenser 25 can be selected.

In this way, since cooling or heating of the conditioning air by the indoor condenser 25 can be selected, convenience of the air conditioner 70 for a vehicle can be increased.

Next, operations of a heating operation mode and a cooling operation mode of the air conditioner 70 for a vehicle will be described. First, the heating operation mode of the air conditioner 70 for a vehicle will be described on the basis of FIG. 6.

Heating Operation Mode

Figure 6:
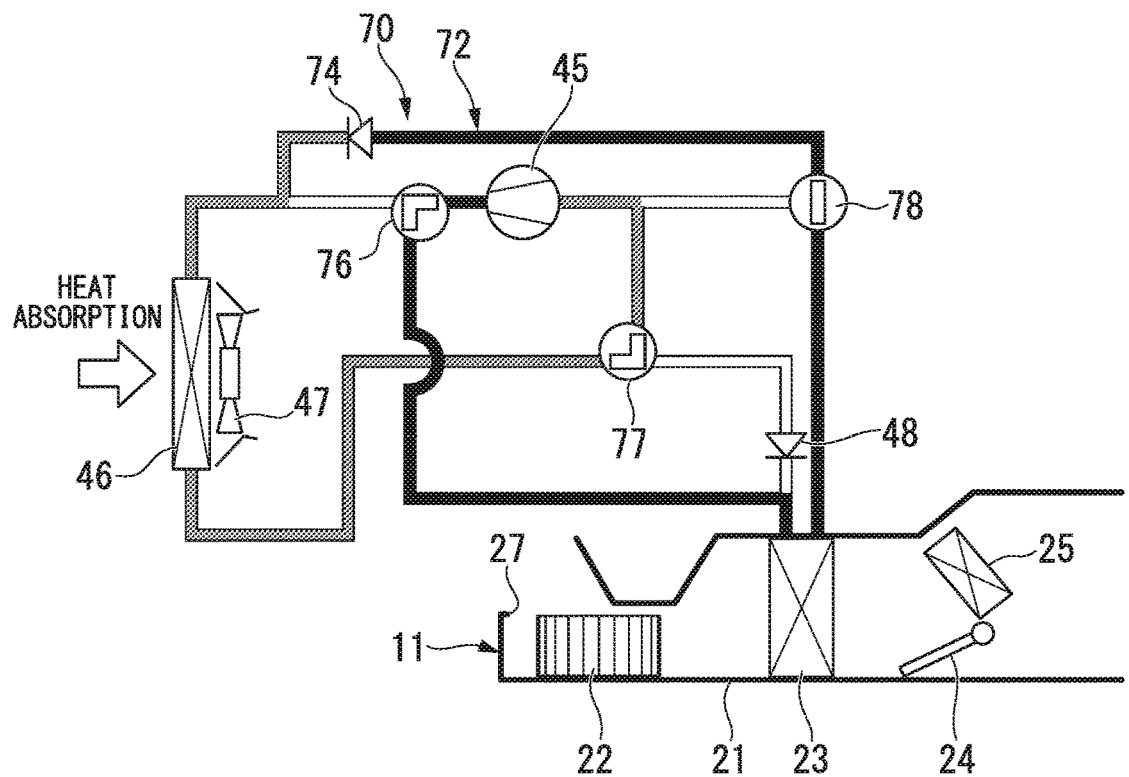
FIG. 6 is a configuration view for explaining an example in which a heating operation is performed by the air conditioner for a vehicle according to the second embodiment of the present invention.

As shown in FIG. 6, when a heating operation is performed by the air conditioner 70 for a vehicle, the air mix damper 24 is disposed at a heating position at which a ventilation route opens toward the indoor condenser 25. In the air-conditioning unit 11, for example, the internal air suction port 27 is in an open state, and the external air suction port 28 (see FIG. 2) is in a closed state. In addition, in the air-conditioning unit 11, for example, the VENT blowout port 31 (see FIG. 2) is in an open state, and the DEF blowout port 32 and the foot blowout port 33 (see FIG. 2) are in a closed state.

Opening and closing of each of the suction ports 27 and 28 or each of the blowout ports 31 to 33 can be arbitrarily changed by an operation of a driver.

In this state, a high temperature and high pressure coolant is ejected from the compressor 45, and the ejected coolant flows into the evaporator 23 via the first switching valve 76. Since the high temperature and high pressure coolant flows into the evaporator 23, the conditioning air passing through the evaporator 23 is heated through heat exchange with the evaporator 23.

The coolant heat-exchanged with the conditioning air in the evaporator 23 flow into the heating expansion valve 74 via the third switching valve 78 from the evaporator 23. The introduced coolant is expanded by the heating expansion valve 74 to form a liquid phase-rich spray form in a low temperature and low pressure state, and flows into the outdoor condenser 46. The introduced coolant becomes gas phase rich through heat exchange with the conditioning air passing through the outdoor condenser 46, and flows into the gas-liquid separator via the second switching valve 77. The introduced coolant is separated into a gas and a liquid in the gas-liquid separator, and then, a gas phase coolant is absorbed to the compressor 45.

Here, since the conditioning air heated through heat exchange with the evaporator 23 passes through the indoor condenser 25, the conditioning air is heated through heat exchange with the indoor condenser 25. For example, the heat-exchanged conditioning air is supplied from the VENT blowout port 31 (see FIG. 2) to heat the passenger compartment.

Next, the cooling operation mode of the air conditioner 70 for a vehicle will be described on the basis of FIG. 5.

Cooling Operation Mode

As shown in FIG. 5, when a cooling operation is performed by the air conditioner 70 for a vehicle, the air mix damper 24 is disposed at a cooling position such that the conditioning air passed through the evaporator 23 bypasses the indoor condenser 25. In the air-conditioning unit 11, for example, the internal air suction port 27 is in an open state, and the external air suction port 28 (see FIG. 2) is in a closed state. In addition, in the air-conditioning unit 11, for example, the VENT blowout port 31 (see FIG. 2) is in an open state, and the DEF blowout port 32 and the foot blowout port 33 (see FIG. 2) are in a closed state. Opening and closing of each of the suction ports 27 and 28 or each of the blowout ports 31 to 33 can be arbitrarily changed by an operation of a driver.

In this state, a high temperature and high pressure coolant is ejected from the compressor 45, and the ejected coolant is guided to the outdoor condenser 46 via the first switching valve 76. Heat exchange is performed between the high temperature and high pressure coolant flowing into the outdoor condenser 46 and the atmosphere outside the passenger compartment. That is, heat of the coolant is radiated to the atmosphere outside the passenger compartment, and further, the coolant is cooled by blowing of the first air guiding means 47.

The cooled coolant flows into the cooling expansion valve 48 via the second switching valve 77. The introduced coolant is expanded by the cooling expansion valve 48 to become a liquid phase-rich spray form, and then, the conditioning air in the duct 21 of the air-conditioning unit 11 is cooled through heat absorption in the evaporator 23. The coolant that cooled the conditioning air in the evaporator 23 flows into the gas-liquid separator via the third switching valve 78. The introduced coolant is separated into a gas and a liquid in the gas-liquid separator, and then, the gas phase coolant is suctioned into the compressor 45.

Here, the conditioning air cooled by the evaporator 23 is supplied from the VENT blowout port 31 (see FIG. 2) to cool the passenger compartment after bypassing the indoor condenser 25.

Next, an example in which active electric power consuming control is performed by the air conditioner 70 for a vehicle such that the remaining capacity of the power storage device 16 does not exceed the predetermined value when the regenerated electric power is accumulated in the power storage device 16 of the air conditioner 70 for a vehicle will be described with reference to FIG. 7.

Figure 7:
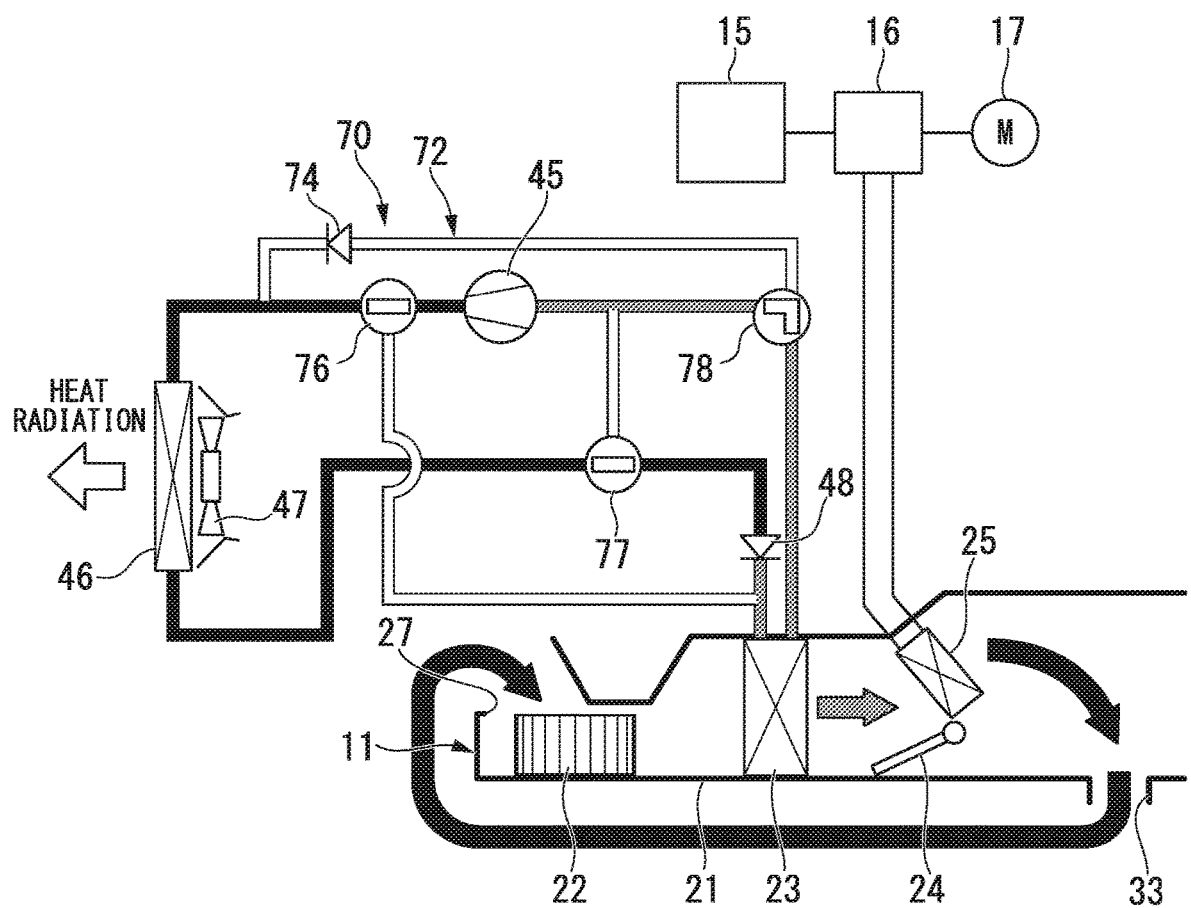
FIG. 7 is a configuration view for explaining an example in which active electric power consuming control is performed by the air conditioner for a vehicle according to the second embodiment of the present invention.

As shown in FIG. 7, in the controller 15, when the remaining capacity of the power storage device 16 exceeds the predetermined value, the air mix damper 24 is disposed at a heating position at which the ventilation route opens toward the indoor condenser 25. In addition, the internal air suction port 27 is in an open state, and the external air suction port 28 (see FIG. 2) is in a closed state.

Further, the foot blowout port 33 is in an open state, and the VENT blowout port 31 and the DEF blowout port 32 (see FIG. 2) are in a closed state. Accordingly, the air conditioner 70 for a vehicle is switched to internal air circulation of suctioning the conditioning air blown out of the foot blowout port 33 from the internal air suction port 27.

In this state, the high temperature and high pressure coolant is ejected from the compressor 45, and the ejected coolant flows into the outdoor condenser 46 via the first switching valve 76. Heat of the high temperature and high pressure coolant is exchanged with the atmosphere outside the passenger compartment, and heat of the coolant is radiated to the atmosphere outside the passenger compartment. Further, the coolant is cooled by blowing of the first air guiding means 47.

The cooled coolant flows into the cooling expansion valve 48 via the second switching valve 77. The introduced coolant is expanded by the cooling expansion valve 48 to become a liquid phase-rich spray form, and the conditioning air in the duct 21 is cooled by heat absorption in the evaporator 23. The conditioning air cooled by the evaporator 23 passes through the indoor condenser 25.

The indoor condenser 25 is heated as electric power is supplied from the power storage device 16. Accordingly, since heat is radiated from the heated indoor condenser 25, the conditioning air passing through the indoor condenser 25 is heated. Accordingly, the electric power can be consumed by the air conditioner 10 for a vehicle. The heated conditioning air is blown out of the foot blowout port 33 into the passenger compartment.

The conditioning air blown out into the passenger compartment flows through a place away from the leg section 56a (see FIG. 4) of the occupant 56 and flows into the internal air suction port 27. Accordingly, an influence on the inside of the passenger compartment or to the occupant 56 (for example, a temperature change in the passenger compartment) can be minimized to a low level using the conditioning air blown out of the foot blowout port 33 into the passenger compartment.

Here, since the conditioning air blown out of the foot blowout port 33 into the passenger compartment flows into the internal air suction port 27 again, the cooled or heated conditioning air in the duct 21 is introduced into the duct 21 again. Further, since the reintroduced conditioning air is cooled or heated again by the evaporator 23 or the indoor condenser 25 in the duct 21, internal air circulation of the conditioning air can be secured.

Since the internal air circulation is sequentially repeated, forced electric power consumption can be facilitated by the air conditioner 70 for a vehicle. Accordingly, overcharging of the power storage device 16 can be prevented by lowering a rate of increase in the remaining capacity of the power storage device 16 (so called, active electric power consuming control).

Third Embodiment

Figure 8:
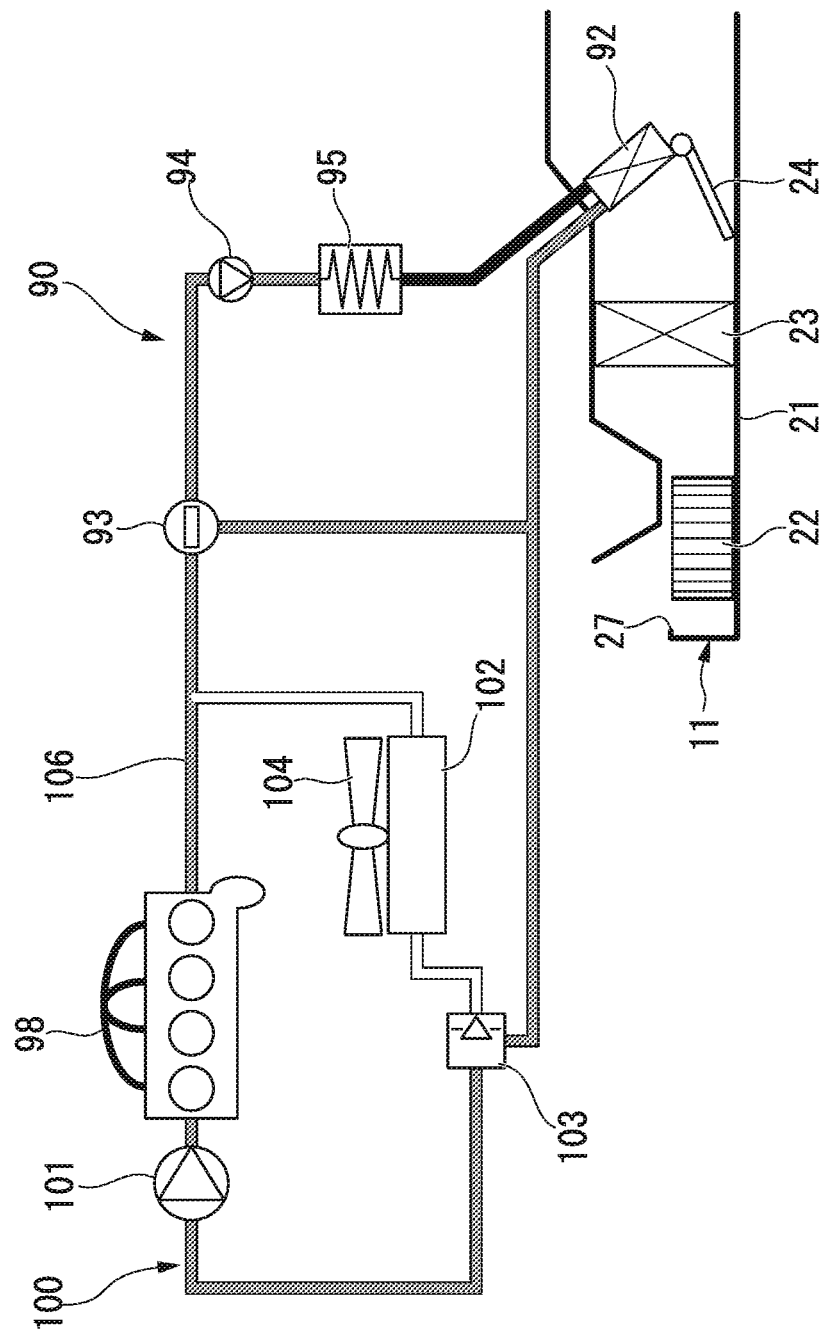
FIG. 8 is a configuration view showing an air conditioner for a vehicle according to a third embodiment of the present invention.

Next, an air conditioner for a vehicle (an air conditioner) 90 of a third embodiment will be described on the basis of FIG. 8 and FIG. 9. As shown in FIG. 8, the air conditioner 90 for a vehicle is obtained by mainly replacing the indoor condenser 25 of the first embodiment with an indoor condenser 92, the other configurations are the same as those of the air conditioner 10 for a vehicle of the first embodiment.

The indoor condenser 92 communicates with a cooling circuit 100 of an engine 98. That is, the air conditioner 90 for a vehicle may be applied to a vehicle such as a hybrid vehicle including the engine 98 or the like, as well as the electrically driven vehicle Ve.

The cooling circuit 100 is a circuit configured to cool the engine 98. That is, the cooling circuit 100 includes a first water pump 101, a radiator 102 and a thermostat 103. A 3-way valve 93, a second water pump 94 and a water heating heater 95 of the air conditioner 90 for a vehicle come in communication with the cooling circuit 100. A cooling flow path 106 of the cooling circuit 100 comes in communication with the indoor condenser 92.

According to the cooling circuit 100, since the first water pump 101 is driven, the cooling water in the cooling flow path 106 flows into the engine 98, and the engine 98 is cooled by the cooling water. When the cooling water exceeds the predetermined temperature, the thermostat 103 is opened to correspond to the predetermined temperature. The cooling water is guided to the radiator 102 as the thermostat 103 is opened. Since the air is sent from a radiator fan 104 to the radiator 102 and the air passes through the radiator 102, the cooling water is cooled through heat exchange. Since the cooled cooling water is guided to the engine 98, the engine 98 is cooled by the cooling water.

When active electric power consuming control is performed in the air conditioner 90 for a vehicle, the 3-way valve 93 is switched to guide the cooling water to the second water pump 94. The guided cooling water is flowing into the water heating heater 95 by the second water pump 94. A temperature of the introduced cooling water is increased by the water heating heater 95. Since the cooling water having the increased temperature flows into the indoor condenser 92, the indoor condenser 92 is heated.

The cooling water that heated the indoor condenser 92 circulates to the engine 98 via the second water pump 94.

Meanwhile, the conditioning air flows into the heated indoor condenser 92 from the evaporator 23.

Here, the evaporator 23 cools the conditioning air in the duct 21 through heat absorption, like the air conditioner 10 for a vehicle of the first embodiment. Accordingly, the conditioning air cooled by the evaporator 23 flows into the heated indoor condenser 92. Since heat is radiated from the indoor condenser 92, the conditioning air passing through the indoor condenser 92 is heated. Accordingly, electric power can be consumed by the air conditioner 10 for a vehicle. The heated conditioning air is blown out of the foot blowout port 33 (see FIG. 2) into the passenger compartment.

The conditioning air blown out of the foot blowout port 33 into the passenger compartment is mixed with the air around the feet of the occupant 56 (see FIG. 4) and flows into the internal air suction port 27 again. That is, the conditioning air cooled or heated in the duct 21 (see FIG. 2) is introduced into the duct 21 again. Further, since the reintroduced conditioning air is cooled or heated again by the evaporator 23 or the indoor condenser 92 in the duct 21, internal air circulation of the conditioning air can be secured.

Since the internal air circulation is sequentially repeated, forced electric power consumption can be facilitated by the air conditioner 90 for a vehicle. Accordingly, overcharging of the power storage device 16 can be prevented by lowering a rate of increase in the remaining capacity of the power storage device 16 (so called, active electric power consuming control).

Variant

Figure 9:
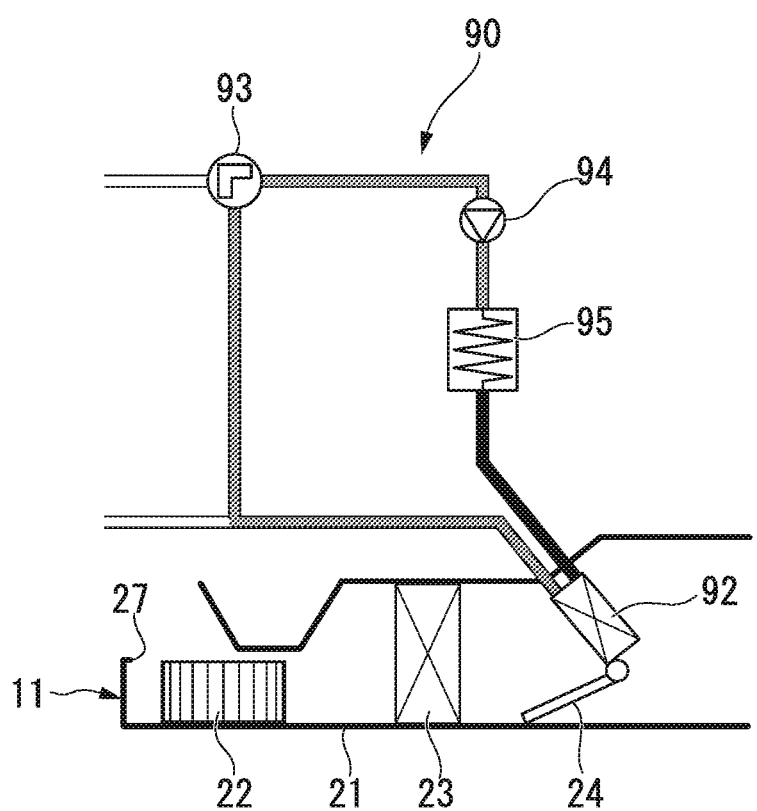
FIG. 9 is a configuration view showing a variant of the air conditioner for a vehicle according to the third embodiment of the present invention.

FIG. 9 is a configuration view showing a variant of the air conditioner 90 for a vehicle of the third embodiment.

As shown in FIG. 9, since the air conditioner 90 for a vehicle can detach a heating circuit of the indoor condenser 92 from the cooling circuit 100 by switching the 3-way valve 93. That is, a circuit of the second water pump 94, the water heating heater 95, the indoor condenser 92 and the 3-way valve 93 can be formed by switching the 3-way valve 93.

In this state, the cooling water is flowing into the water heating heater 95 by the second water pump 94. A temperature of the introduced cooling water is increased by the water heating heater 95. The indoor condenser 92 is heated by introducing the cooling water having the increased temperature into the indoor condenser 92.

The cooling water that heated the indoor condenser 92 returns to the second water pump 94 via the 3-way valve 93.

The conditioning air cooled by the evaporator 23 flows into the heated indoor condenser 92. Since the cooled conditioning air flows into the indoor condenser 92, the conditioning air passing through the indoor condenser 92 is heated through heat radiation from the indoor condenser 92. Accordingly, electric power can be consumed by the air conditioner 10 for a vehicle. The heated conditioning air is blown out of the foot blowout port 33 (see FIG. 2) into the passenger compartment.

In this way, a circuit of the second water pump 94, the water heating heater 95, the indoor condenser 92 and the 3-way valve 93 can be formed by switching the 3-way valve 93.

According to the circuit, since the second water pump 94 is driven, the cooling water is flowing into the water heating heater 95 by the second water pump 94.

The temperature of the introduced cooling water is increased by the water heating heater 95. Since the cooling water having the increased temperature flows into the indoor condenser 92, the indoor condenser 92 is heated. The cooling water that heated the indoor condenser 92 flows into the second water pump 94 via the 3-way valve 93.

In the air conditioner 90 for a vehicle shown in FIG. 9, a circuit is constituted by the second water pump 94, the water heating heater 95, the indoor condenser 92 and the 3-way valve 93. Accordingly, the air conditioner 90 for a vehicle shown in FIG. 9 can be applied to the electrically driven vehicle Ve or the fuel cell vehicle, in which the engine 98 is not provided, like the air conditioner 90 for a vehicle of the first embodiment or the air conditioner 70 for a vehicle of the second embodiment.

Fourth Embodiment

Figure 10:
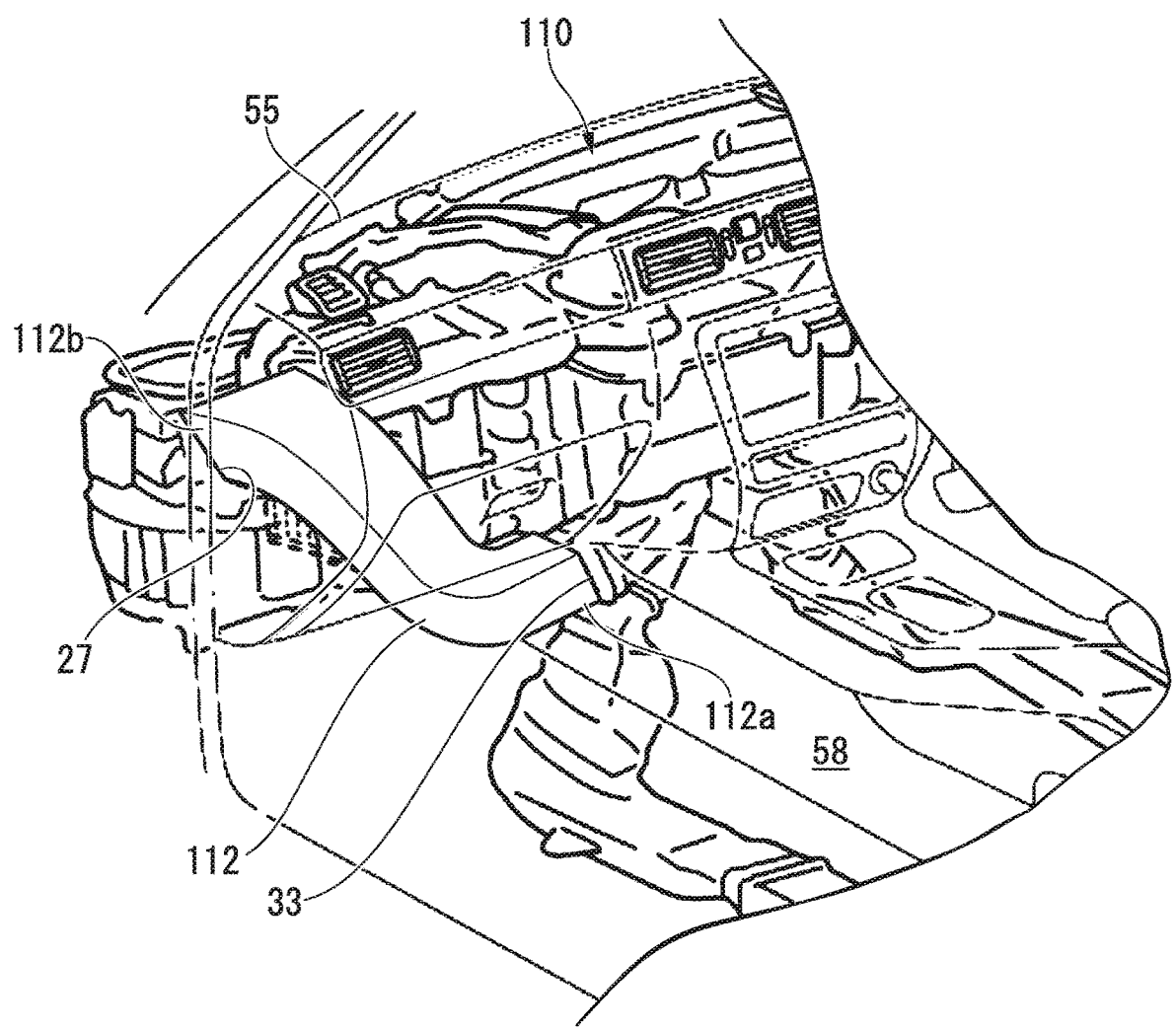
FIG. 10 is a perspective view showing an air conditioner for a vehicle according to a fourth embodiment of the present invention.

Next, an air conditioner for a vehicle (an air conditioner) 110 of a fourth embodiment will be described on the basis of FIG. 10 and FIG. 11. As shown in FIG. 10, the air conditioner 110 for a vehicle includes a communication duct 112 (a communication section 112) in the duct 21 of the first embodiment, the other configurations are similar to the air conditioner 10 for a vehicle of the first embodiment.

The communication duct 112 is a hollow duct. The communication duct 112 has a base end portion in communication with the foot blowout port 33 and a tip portion in communication with the internal air suction port 27. That is, the foot blowout port 33 communicates with the internal air suction port 27 via the communication duct 112. The communication duct 112 is disposed on an inner side of the installment panel 55 (a front side of the vehicle body). Accordingly, the communication duct 112 can be hidden by the installment panel 55 such that the communication duct 112 cannot be seen from the passenger compartment 58 side.

Figure 11:
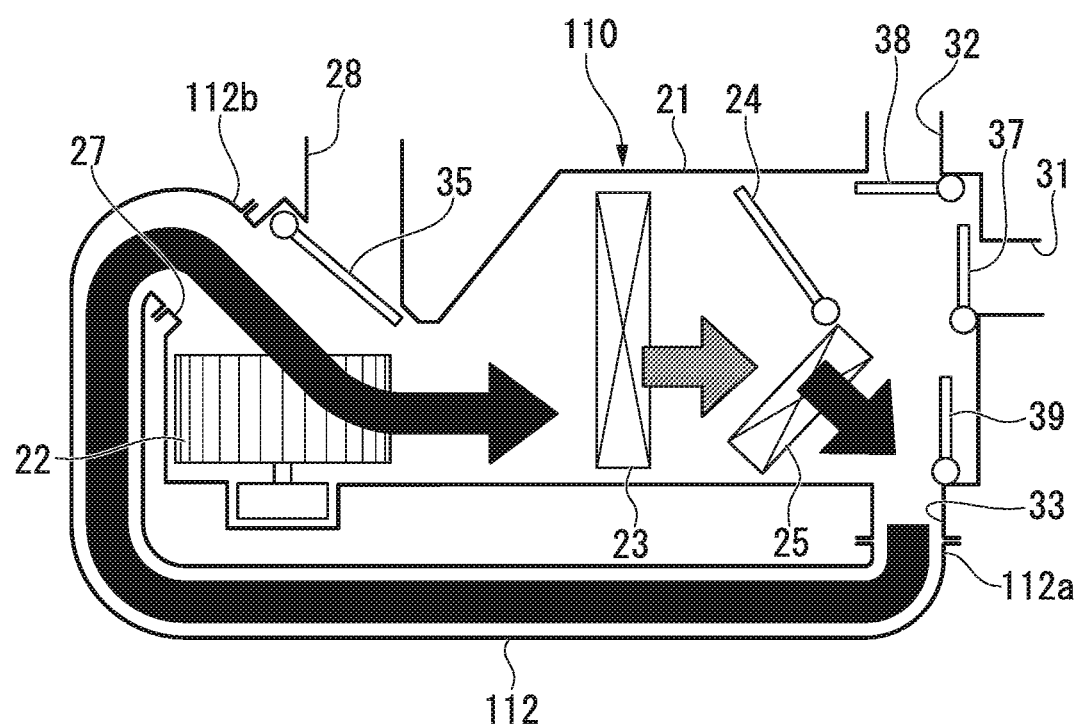
FIG. 11 is a configuration view for explaining an example in which active electric power consuming control is performed by the air conditioner for a vehicle according to the fourth embodiment of the present invention.

As shown in FIG. 11, since the foot blowout port 33 communicates with the internal air suction port 27 via the communication duct 112, the conditioning air blown out of the foot blowout port 33 can flow into the internal air suction port 27 again via the communication duct 112. That is, the conditioning air cooled or heated in the duct 21 (see FIG. 2) can be introduced into the duct 21 again.

Since the conditioning air blown out of the foot blowout port 33 flows into the internal air suction port 27 again via the communication duct 112, the conditioning air heated in the air conditioner 110 for a vehicle can flow into the internal air suction port 27 without blowing-out into the passenger compartment 58. Accordingly, an influence (for example, a temperature change in the passenger compartment) to the inside of the passenger compartment 58 or to the occupant 56 (see FIG. 4) due to the heated conditioning air can be minimized to a lower level.

Further, since the conditioning air reintroduced into the duct 21 is cooled or heated again by the evaporator 23 or the indoor condenser 25 in the duct 21, circulation of the conditioning air can be secured.

Since the circulation is sequentially repeated, forced electric power consumption can be facilitated by the air conditioner 10 for a vehicle. Accordingly, overcharging of the power storage device 16 can be prevented by lowering a rate of increase in the remaining capacity of the power storage device 16 (so called, active electric power consuming control).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, while the example in which the foot blowout port 33 is disposed close to the internal air suction port 27 and the conditioning air blown out of the foot blowout port 33 circulates through the internal air suction port 27 has been described in the first embodiment to fourth embodiment, there is no limitation thereto. As other examples, another blowout port may be disposed close to the internal air suction port 27, and conditioning air blown out of another blowout port may circulate through the internal air suction port 27.

What is claimed is:

1. An electrically driven vehicle comprising:
   an electric motor;
   a power storage device electrically connected to the electric motor;
   an air conditioner;
   a heat exchanger of a refrigerating cycle installed in a path of the air conditioner;
   a heater; and
   a controller that controls at least the electric motor, the power storage device, the air conditioner, the heat exchanger and the heater,
   wherein the air conditioner includes an internal air suction port that opens in a passenger compartment, and a foot blowout port installed at a position close to the internal air suction port and from which conditioning air is blown out toward a feet of an occupant, and
   in a case a remaining capacity of the power storage device exceeds a predetermined value during regeneration by the electric motor, the controller operates the refrigerating cycle and the heater, and further, switches to an internal air circulation in which the conditioning air blown out of the foot blowout port is suctioned from the internal air suction port.

2. The electrically driven vehicle according to claim 1, wherein the refrigerating cycle is a cooling-dedicated circuit.

3. The electrically driven vehicle according to claim 1, wherein the refrigerating cycle is a circuit that is able to select cooling or heating of the conditioning air using the heat exchanger by switching a switching valve.

4. An electrically driven vehicle comprising:
   an electric motor;
   a power storage device electrically connected to the electric motor;
   an air conditioner;
   a heat exchanger of a refrigerating cycle installed in a path of the air conditioner;
   a heater; and
   a controller that controls at least the electric motor, the power storage device, the air conditioner, the heat exchanger and the heater,
   wherein the air conditioner includes an internal air suction port that opens in a passenger compartment, a foot blowout port installed at a position close to the internal air suction port and from which conditioning air is blown out toward a feet of an occupant, and a communication section that allows the foot blowout port and the internal air suction port to communicate with each other, and
   in a case a remaining capacity of the power storage device exceeds a predetermined value during regeneration by the electric motor, the controller operates the refrigerating cycle and the heater, and further, switches to a circulation in which the conditioning air blown out of the foot blowout port is suctioned from the internal air suction port via the communication section.

* * * * *